(12) United States Patent
Huang et al.

(10) Patent No.: US 12,229,102 B2
(45) Date of Patent: Feb. 18, 2025

(54) ASSET TRANSFER RECORDING SYSTEM, ASSET TRANSFER RECORDING METHOD AND COMPUTER-READABLE NON-TRANSITORY STORAGE MEDIUM STORING COMPUTER PROGRAM

(71) Applicant: DENSO CORPORATION, Kariya (JP)

(72) Inventors: Haolun Huang, Kariya (JP); Yawen Huang, Kariya (JP); Xin Xu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/459,170

(22) Filed: Aug. 31, 2023

(65) Prior Publication Data

US 2023/0409549 A1 Dec. 21, 2023

Related U.S. Application Data

(63) Continuation of application No. PCT/JP2022/001556, filed on Jan. 18, 2022.

(60) Provisional application No. 63/156,738, filed on Mar. 4, 2021.

(51) Int. Cl.
*G06F 16/00* (2019.01)
*G06F 16/22* (2019.01)

(52) U.S. Cl.
CPC ................ *G06F 16/2255* (2019.01)

(58) Field of Classification Search
CPC ................................. G06F 16/2255
USPC ...................................... 707/747
See application file for complete search history.

(56) References Cited

U.S. PATENT DOCUMENTS

2021/0166245 A1* 6/2021 Novotny ............. H04L 67/1078
2021/0357384 A1* 11/2021 Rozenbaum ........ G06F 16/2315
2022/0058282 A1* 2/2022 Ricotta, Jr. ............ G16H 10/20

OTHER PUBLICATIONS

Elli Androulaki, Artem Barger, Vita Bortnikov, Christian Cachin, Konstantinos Christidis, Angelo De Caro, David Enyeart, Christopher Ferris, Gennady Laventman, Yacov Manevich, Srinivasan Muralidharan, Chet Murthy, Binh Nguyen, Manish Sethi, Gari Singh, Keith Smith, Alessandro Sorniotti, Chrysoula Stathakopoulou, Marko Vukolić, Sharon Weed Cocco, and Jason Yellick,"Hyperledger Fabric: A Distributed Operating System for Permissioned Blockchains", EuroSys 2018 conference, Apr. 2018.
Hyperledger_fabric_whitepaper.

* cited by examiner

*Primary Examiner* — Chelcie L Daye
(74) *Attorney, Agent, or Firm* — Maschoff Brennan

(57) ABSTRACT

An asset transfer recording system includes a node and a data storage server. The node includes a node processor programmed to generate a data processing rule according to a request by a transferor of an asset. The node processor is further programmed to store the data processing rule on the blockchain; generate a data processing command according to the data processing rule; and send the data processing command to the data storage server. The data storage server includes a server processor programmed to process the plurality of data items according to the data processing command and generate and send a processing result to the node processor. The node processor is further programmed to store the processing result on the blockchain.

9 Claims, 8 Drawing Sheets

_US 12,229,102 B2_

ASSET TRANSFER RECORDING SYSTEM, ASSET TRANSFER RECORDING METHOD AND COMPUTER-READABLE NON-TRANSITORY STORAGE MEDIUM STORING COMPUTER PROGRAM

CROSS REFERENCE TO RELATED APPLICATIONS

This application is a continuation application of International Patent Application No. PCT/JP2022/001556 filed on Jan. 18, 2022, which designated the U.S. and claims the benefit of priority from Provisional Application No. 63/156,738 filed on Mar. 4, 2021. The entire disclosure of the above application is incorporated herein by reference.

TECHNICAL FIELD

The subject matter described herein relates in general to an asset transfer recording system, a method for recording an asset transfer, and a computer-readable non-transitory storage medium storing a computer program.

BACKGROUND

Hyperledger fabric provides limited information channel based sharing system to protect confidential data between multiple consortiums in a blockchain network. However, this piece of the mechanism is not able to support complicated privacy control such as a system for each particular nature person. For example, after a physical asset is sold or transferred to another user in the second hand market, asset data related to the previous user is not able to inherit after ownership change due to the privacy concern. Thus, there has been a demand for a system that is configured to provide asset data traceability with tamper proof while considering privacy concern of the previous user.

SUMMARY

This section provides a general summary of the disclosure, and is not a comprehensive disclosure of its full scope or all of its features.

According to a first aspect of the present disclosure, an asset transfer recording system includes a node that stores a blockchain to record a history of an asset transfer and a data storage server that stores asset data of an asset to be transferred. The asset data is formed of a plurality of data items that have been collected and updated. The node includes a node processor and a node memory coupled to the node processor and storing program instructions that, when executed by the node processor, cause the node processor to: generate a data processing rule according to a request by a transferor of the asset, the data processing rule defining a rule of processing the asset data; store the data processing rule on the blockchain; generate a data processing command according to the data processing rule, the data processing command being a command for the data storage server to process the plurality of data items; and send the data processing command to the data storage server. The data storage server includes: a server processor; and a server memory coupled to the server processor and storing program instructions that, when executed by the server processor, cause the server processor to: process the plurality of data items according to the data processing command upon receiving the data processing command from the node processor; and generate and send a processing result to the node processor upon completing processing the asset data. The node processor is further programmed to store the processing result on the blockchain upon receiving the processing result from the server processor.

According to a second aspect of the present disclosure, an asset transfer recording method is a method for recording a history of an asset transfer on a blockchain. The method includes storing, with a data storage server, asset data of an asset to be transferred. The asset data is formed of a plurality of data items that have been collected and updated. The method further includes generating, with a node, a data processing rule according to a request by a transferor of the asset. The data processing rule defines a rule of processing the asset data. The method further includes storing, with the node, the data processing rule on the blockchain; generating, with the node, a data processing command according to the data processing rule. The data processing command is a command for the data storage server to process the plurality of data items. The method further includes; processing, with the data storage server, the plurality of data items according to the data processing command; generating, with the data storage server, a processing result upon completing processing the asset data; and storing, with the node, the processing result on the blockchain upon generating the processing result.

According to a third aspect of the present disclosure, a computer-readable non-transitory storage medium storing a computer program configured to cause a processor to: store, with a data storage server, asset data of an asset to be transferred, the asset data being formed of a plurality of data items that have been collected and updated; generate, with a node, a data processing rule according to a request by a transferor of the asset, the data processing rule defining a rule of processing the asset data; store, with the node, the data processing rule on a blockchain; generate, with the node, a data processing command according to the data processing rule, the data processing command being a command for the data storage server to process the plurality of data items; process, with the data storage server, the plurality of data items according to the data processing command; generate, with the data storage server, a processing result upon completing processing the asset data; and store, with the node, the processing result on the blockchain upon generating the processing result.

BRIEF DESCRIPTION OF DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, elements may not be drawn to scale.

DESCRIPTION OF EMBODIMENTS

Figure 1:
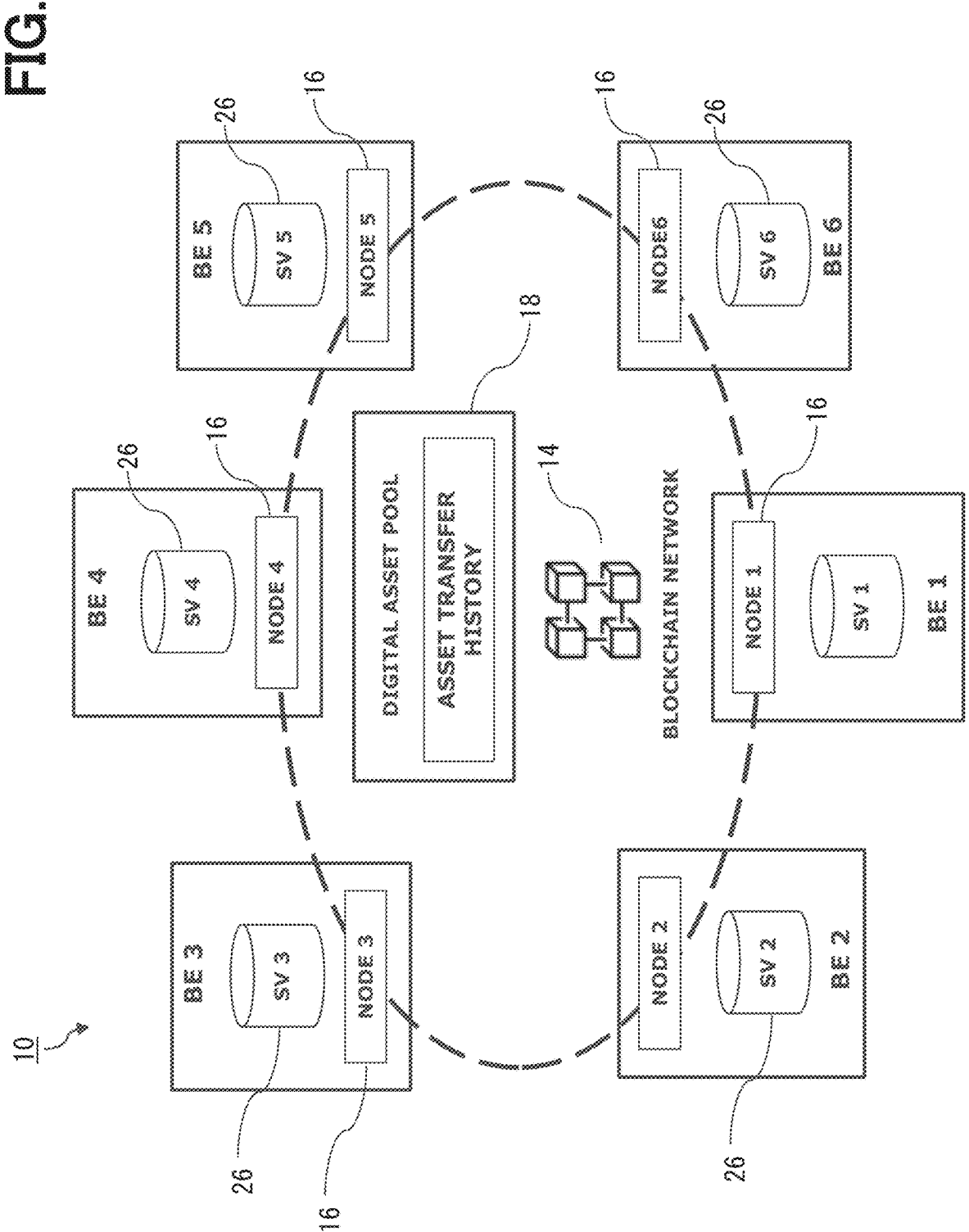
FIG. 1 schematically illustrates the entire configuration of one embodiment of an asset transfer recording system.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

FIG. 1 shows a diagram schematically illustrating one example of an asset transfer recording system (hereinafter, referred to as a "system") 10 according to the present embodiment. The system 10 is configured to record ownership of assets (i.e., properties) such as cars, houses, digital assets or the like and also record transactions involving asset transfers using blockchain technology. The system 10 constitutes a blockchain consortium in which only authorized or permitted entities are allowed to participate. The system 10 is also configured to store and update information related to assets on local servers (data storage servers 26 as will be described later). The information stored on the local servers can be flexibly processed (e.g., partially or entirely removed from the local servers) according to requests by owners of assets when transferring an asset. In this embodiment, the system 10 is formed of a plurality of business entities BE which participate in this consortium as shown in FIG. 1. Such business entities BE may include, but not necessarily limited to, automakers (OEMs), insurance companies, repair shops (or dealers), banks, and so on. Each business entity BE can serve as a node which forms a blockchain network 14 to store ownership of assets and asset transfer histories. Each business entity BE further serves as a local server that stores the information related to assets in own database. Therefore, each business entity BE operates in both on-chain layer and off-chain layer.

As shown in FIG. 1, the system 10 includes six business entities BE 1 to BE 6 in this embodiment. Each business entity BE includes a node 16, and all nodes 16 of the participating entities BE are connected to each other to form the blockchain network 14. All nodes 16 store and preserve a blockchain BC on which ownership of assets and transfer histories thereof are recorded. More specifically, each node 16 is configured to store ownership of assets and their transfer histories in a digital asset pool 18 on the blockchain BC. In the digital asset pool 18, information such as an asset ID, an ownership ID, date of transfer, and so on for each asset is recorded. Such information in the digital asset pool 18 is accessible by authorized persons or entities such as current owners, prospective owners who are seeking an asset, and any other interested parties. Furthermore, each node 16 is configured to store a data processing rule 20, a processing result 22, and a location table 24 on the blockchain BC, as will be described in detail later. It should be noted that the nodes 16 may work on a variety types of publicly-known blockchain platforms such as Ethereum, Hyperledger Fabric, or the like.

Figure 2:
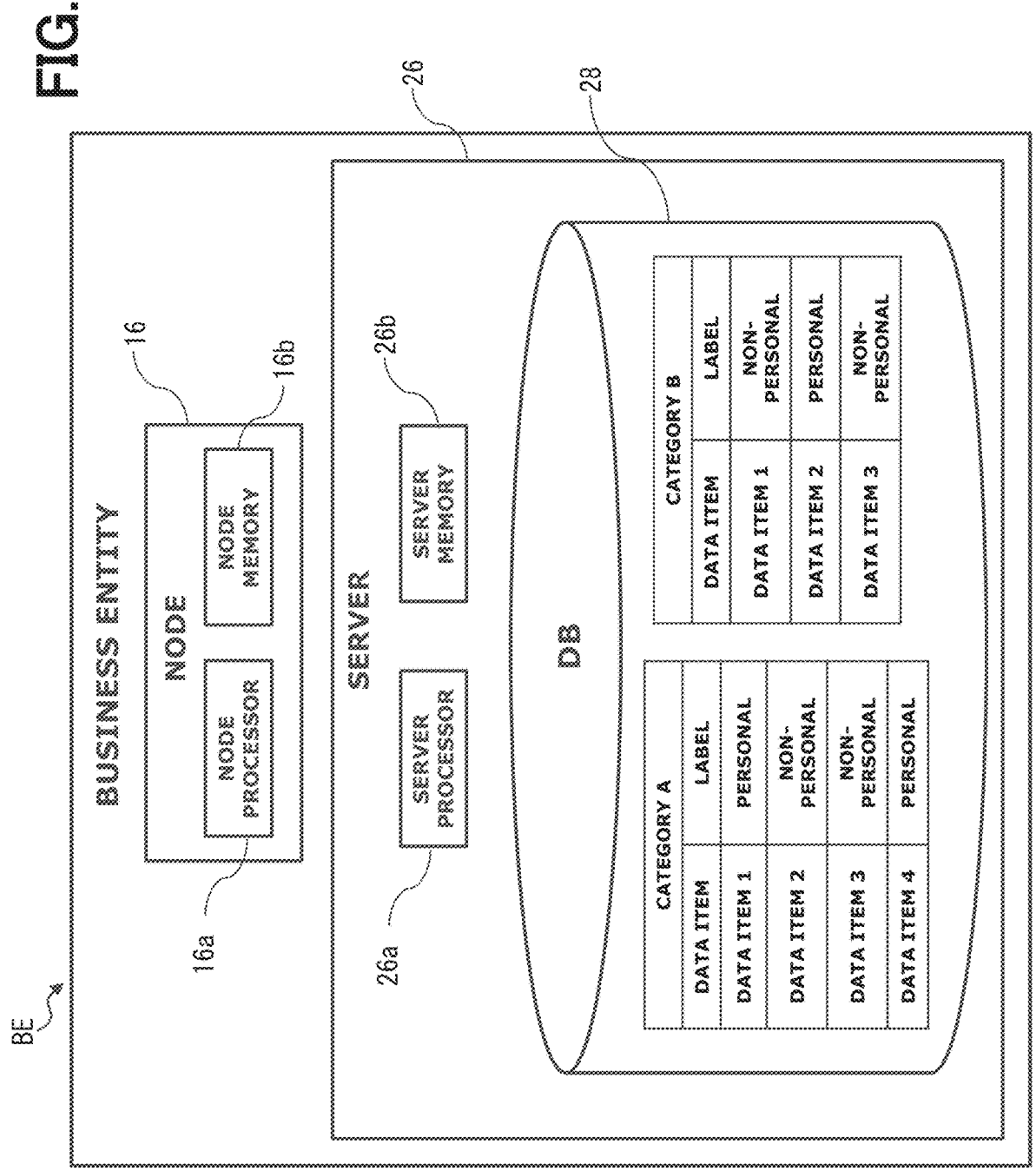
FIG. 2 illustrates a block diagram of a business entity according to the embodiment.

Each business entity BE includes a data storage server 26 (i.e., a local server and hereinafter, referred to as a "server") having a database (DB) 28. Information related to assets is stored on the DB 28. FIG. 2 shows a block diagram of the node 16 and the server 26 of one of the business entities BE.

As shown in FIG. 2, the server 26 includes at least one processor (or a server processor 26*a*) and at least one memory (or a server memory 26*b*). The server processor 26*a* may be a microprocessor that is capable of performing various functions as described herein when executing programs stored on the server memory 26*b*. The server memory 26*b* may be a random-access memory (RAM), read-only memory (ROM), a hard disk drive, a flash memory, or other suitable memory for storing programs. The programs are computer-readable instructions that, when executed by the server processor 26*a*, cause the server processor 26*a* to perform the various functions disclosed herein.

The server 26 is configured to store information related to one or more assets (hereinafter, referred to as "asset data") on the DB 28. The server 26 is also configured to update the asset data upon receiving updated information of the asset. Each server 26 stores one or more particular data types (or data categories) of the asset data on the DB 28, and each data category includes one or more data items. In other words, the asset data for an asset is formed of one or more data items and these data items are categorized into one or more data categories in each DB 28. The one or more data categories of the asset data are unique for each server 26, and thus the one or more data categories of the asset data stored on one server 26 are different from the data categories of the asset data stored on the other servers 26. In the example of FIG. 2, the DB 28 stores asset data categorized into category A and category B. The category A includes 4 data items (data item 1 to data item 4), whereas the category B includes 3 data items (data item 1 to data item 3). Furthermore, each data item is tagged with a label based on its sensitivity to personal matter of the asset owner. If a data item is highly private information or personally-identifiable information for the owner of the asset, the data item is labeled as "personal" as shown in FIG. 2. On the contrary, if a data item is public information or personally-unidentifiable information, the data item is labeled as "non-personal." In the following description, a data item labeled as "personal" may be referred to as a personal data item and a data item labeled as "non-personal" may be referred to as a non-personal data item.

Figure 3:
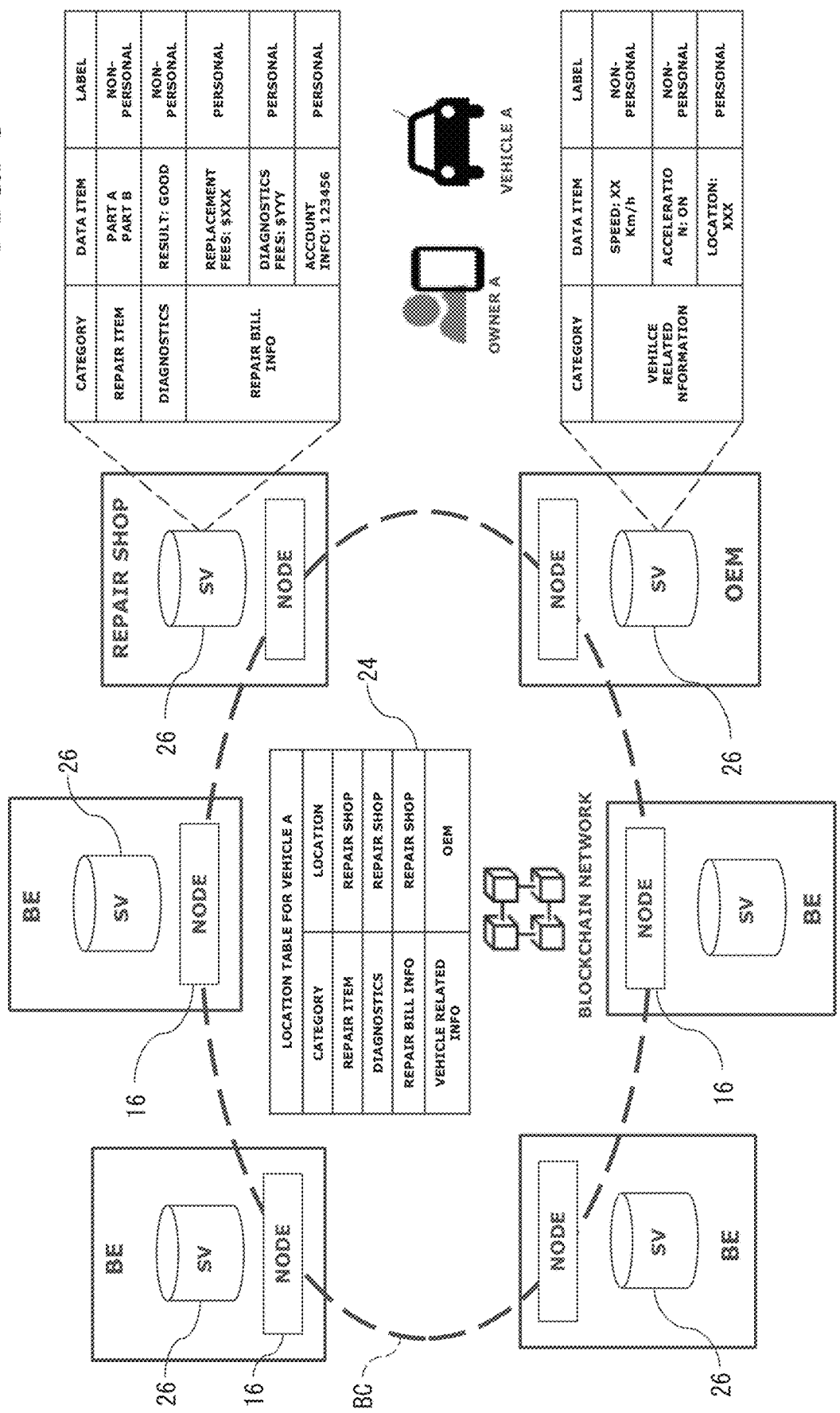
FIG. 3 is a diagram illustrating an example of a data structure of asset data stored on data storage servers.

For example, as shown in FIG. 3, when the asset is a particular car (referred to as "vehicle A"), an automaker (or an OEM) as one example of the business entities BE may collect vehicle related information such as speeds, locations, accelerations, and so on. In this example, the vehicle related information is the data category of the asset data and each data of the speeds, locations, accelerations and so on forms the data item. Thus, this OEM stores only a single data category with a plurality of data items. Furthermore, since the speeds and the accelerations are categorized as public data or personally-unidentifiable data, these data items can be labeled as the non-personal data item. On the contrary, since the locations in this example are categorized as personal data or personally-identifiable data, these data items can be labeled as the personal data item. It should be noted that in this example, the OEM has collected the vehicle related information of the vehicle A by receiving such information from, e.g., electronic control units (ECUs) mounted in the vehicle A when the vehicle A is travelling or parked.

A repair shop as another example of the business entities BE may collect, for example, three categories of the asset data, i.e., "repair item", "diagnostics", and "repair bill information" as to the vehicle A, as shown in FIG. 3. The data category of the repair item may include "part A" and "part B" that are parts of the vehicle A repaired at the repair shop. The data category of the diagnostics may include information of the results of the diagnostic conducted after the vehicle A is repaired. The information of the diagnostics results may be "Good", for example. The data category of the repair bill information may include, as the data items, invoice items such as "replacement fees", "diagnostics fees," and "account information". In this example, all information of the data category of the repair item (i.e., part A and part B) are labeled as the non-personal data item and the diagnostics result in the data category of the diagnostics is also labeled as the non-personal data item. In the data category of the repair bill information, all data items may be labeled as the personal data item. It should be noted that the repair shop stores these types of information when a mechanic or the like of the repair shop inputs the information in the DB 28 after repair of the vehicle A was finished.

When an owner (i.e., a transferor) wishes to transfer his/her asset to a new owner (i.e., a transferee), the owner can make a request to process the asset data of his/her asset that has been collected by one or more business entities BE. More specifically, the transferor is able to decide which asset data is kept and which asset data is removed prior to asset transfer. For example, the transferor makes a request for removing the personal data items and keeping the non-personal data items. An owner can make the data processing request via any types of devices such as a mobile phone, a tablet device, a computer, or the like. The data processing request may be sent to one of the business entities BE selected by the owner. Alternatively, the system 10 may include a center node which is dedicatedly configured to accept and treat the data processing request and transmit it to one or more suitable business entities BE.

This data processing request may be done in a detailed manner by specifically defining how the asset data for each data item should be treated. In this case, an owner can individually designate data items as "keep" or "remove" one by one. Thus, the owner can designate a personal data item as "keep" and designate a non-personal data item as "remove." Alternatively, the request may be done more generally by, for example, defining how the asset data is treated for each data category. In this case, an owner cane designate data categories as "keep," "remove," or "de-identify." When the owner designates a data category as "keep," all data items including personal data items within the data category can be kept altogether. On the other hand, when the owner designates a data category as "remove," all data items including non-personal data items data within the data category can be removed altogether. Furthermore, when the owner designates a data category as "de-identify," only non-personal data items within the data category can be kept and all personal data items within the data category will be removed.

As with the server 26, the node 16 includes at least one processor (or a node processor 16a) and at least one memory (or a node memory 16b). In one aspect, the node processor 16a may be an electronic processor such as a microprocessor that is capable of performing various functions as described herein when executing programs stored on the node memory 16b. In one embodiment, the node memory 16b may be a random-access memory (RAM), read-only memory (ROM), a hard disk drive, a flash memory, or other suitable memory for storing programs. The programs are computer-readable instructions that, when executed by the node processor 16a, cause the node processor 16a to perform the various functions disclosed herein. Furthermore, some functions by the node processor 16a on the on-chain layer are provided via decentralized applications (apps) by executing smart contracts stored on the blockchain BC upon satisfying predetermined conditions, as will be described in detail below.

The node processor 16a is configured to generate the data processing rule 20 upon receiving the data processing request from an owner. The data processing rule 20 is a rule defining how the asset data of the owner's asset should be treated. The data processing rule 20 is automatically generated according to the data processing request by a "processing manager application 30" which is a decentralized application (app) that runs when a smart contract is executed by the node processor 16a. The processing manager application 30 (i.e., the node processor 16a) is programmed to store the data processing rule 20 on the blockchain BC when generating it.

The node processor 16a is further configured to store the location table 24 on the blockchain BC. The location table 24 is a table showing correspondence between the data categories and their locations (the servers 26). In the above-described example shown in FIG. 3, the location table 24 shows that the data category of "repair item" and the data category of "repair bill information" are located (i.e., stored) at the server 26 of the repair shop. Furthermore, the location table 24 shows that the data category of "vehicle related information" is located (i.e., stored) at the server 26 of the OEM. As shown in this example, the location table 24 does not list the data items themselves.

The processing manager application 30 is further programmed to access to a root policy 32 (see FIG. 4), which is another application (app) that runs when a smart contract is executed, to obtain data locations for the asset data. Then, the root policy 32 is programmed to obtain locations of the asset data by referring to the location table 24. If the asset data is stored across one or more servers 26, the processing manager application 30 obtains a plurality of data locations designating the one or more servers 26 through the root policy 32. On the contrary, if the asset data is stored on only one server 26, the processing manager application 30 obtains a single data location through the root policy 32.

The processing manager application 30 is further programmed to generate at least one data processing command 34 based on the data processing rule 20 generated by itself and the data locations obtained from the root policy 32. The data processing command 34 includes instructions for the servers 26 to define how data items are treated at the servers 26. If the asset data is stored across two or more servers 26, the processing manager application 30 generates the corresponding numbers of the data processing commands 34 for all the servers 26. Each data processing command 34 is customized for the corresponding server 26 according to the data processing rule 20. On the contrary, if the asset data is stored on a single server 26, the processing manager application 30 generates only one data processing command 34 for the server 26.

When a server 26 receives the data processing command 34 from the processing manager application 30, the server processor 26a is programmed to treat each data item stored on the DB 28 according to the data processing command 34 customized for that server 26. The server processor 26a is further programmed to generate a data processing result 22 when the server processor 26a completes processing the data items. The processing result 22 shows how the data items were processed at the server 26. The server processor 26a sends the processing result 22 to the node 16.

The processing manager application 30 is further programmed to generate an expected result 36 (see FIG. 4) based on the data processing rule 20. The expected result 36 is an expected output from the servers 26 which would be produced if the servers 26 properly process the asset data according to the data processing commands 34. Furthermore, the processing manager application 30 is programmed to verify whether the asset data was properly processed according to the data processing rule 20 by comparing the processing results 22 received from the data storage servers 26 to the expected result 36. If the processing results 22 match the expected result 36, the processing manager application 30 issues a success notification that the asset data was properly processed and sends the notification to the owner. On the contrary, if the processing results 22 do not match the expected result 36, the processing manager application 30 issues a failure notification and sends the failure notification to the owner. Furthermore, upon verifying the asset data was properly processed, the processing manager application 30 is programmed to store the processing results 22 on the blockchain BC so that the owner can access to the stored processing results 22 for review. When the owner confirms that the asset data was processed according to the data processing request, the processing manager application 30 changes the record of the ownership of the asset in the data asset pool 18.

Next, one example of the entire process performed by the system 10 according to the present embodiment when asset transfer is requested by an owner. In the following example, it is assumed that the current owner A of a vehicle A (an automotive) makes a proposal for changing the ownership to a new owner B as described in the example illustrated in FIG. 3. In this example, it is further assumed that the asset data of the vehicle A has been collected by an OEM where the vehicle A was manufactured and a repair shop (a dealer) where the vehicle A was repaired in the past. As described above, at the OEM, a single data category of "the vehicle related information" with three data items of "speeds," "locations," and "accelerations" is stored on its DB 28. The data items of "speeds" and "accelerations" are labeled as the non-personal data item, and the data item of "locations" is labeled as the personal data item. Further, the repair shop stores three data categories of the asset data of "repair items," "diagnostics," and "repair bill information." The data category of "repair item" includes two data items of "part A" and "part B" labeled as the non-personal data items. The data category of "diagnostics" includes a single data item of "result" labeled as the non-personal data item. The data category of "repair bill information" includes three data items of "replacement fees," "diagnostics fess," and "account information." These three data items are labeled as the personal data item.

The system 10 also stores the location table 24 regarding the vehicle A on the blockchain BC. The location table 24 indicates correspondence between each data category and the corresponding data storage server 26 (the business entity BE) which stores the data category (i.e., the OEM and the repair shop). As shown in FIG. 3, the location table 24 indicates the data categories of "repair item", "diagnostics," and "repair bill information" are stored on the repair shop and the data category of "vehicle related information" is stored on the OEM. In this example, it is assumed that the owner makes the data processing request by designating the categories of "repair item" and "diagnostics" as "keep," the category of "repair bill information" as "remove," and the category of "vehicle related information" as "de-identify." Alternatively, the owner A may designate each data item as "keep" or "remove" as described above.

Figure 4:
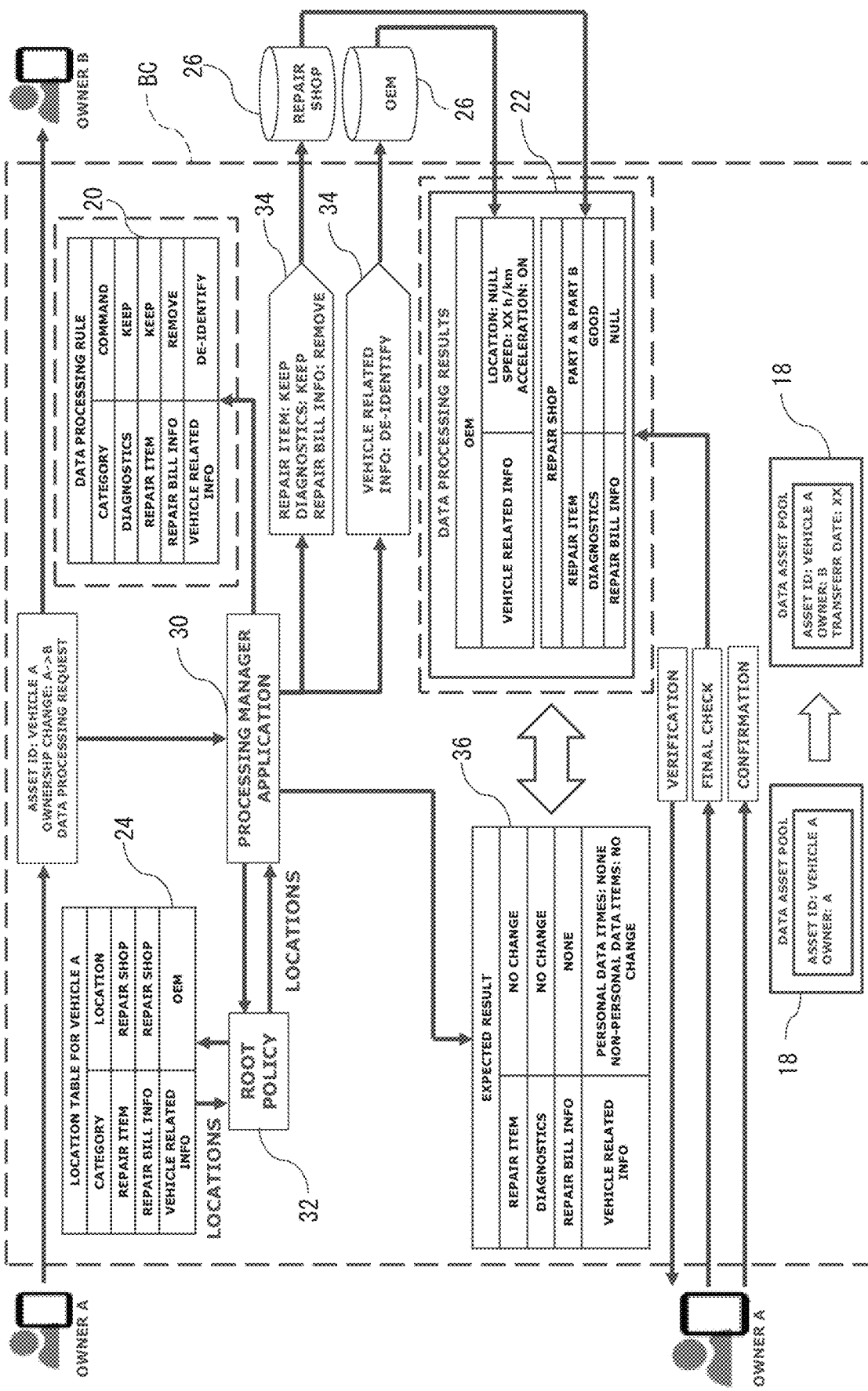
FIG. 4 illustrates the entire flow of processes executed by the system when asset transfer is requested.
Figure 5:
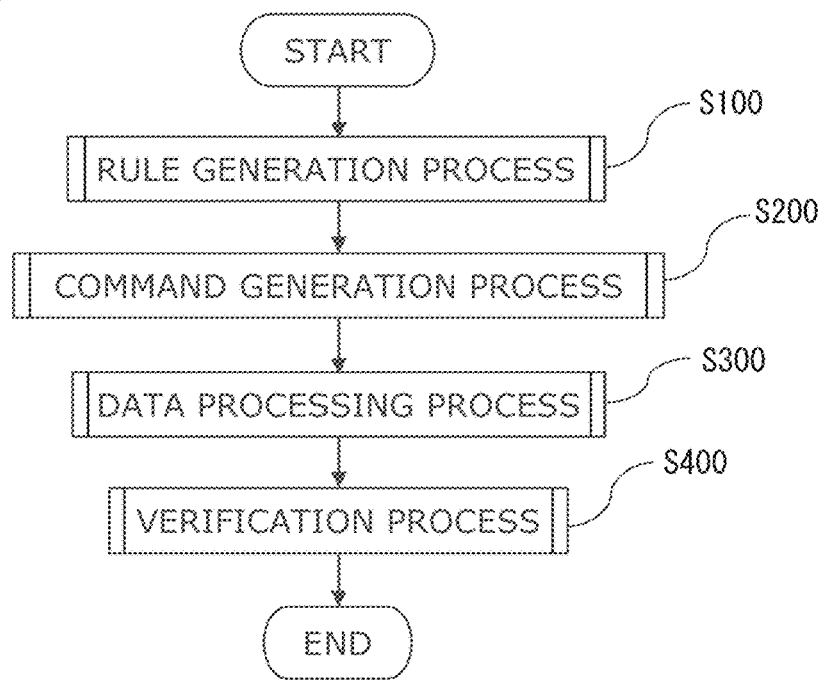
FIG. 5 generally shows one embodiment of the entire process performed by the system.
Figure 6:
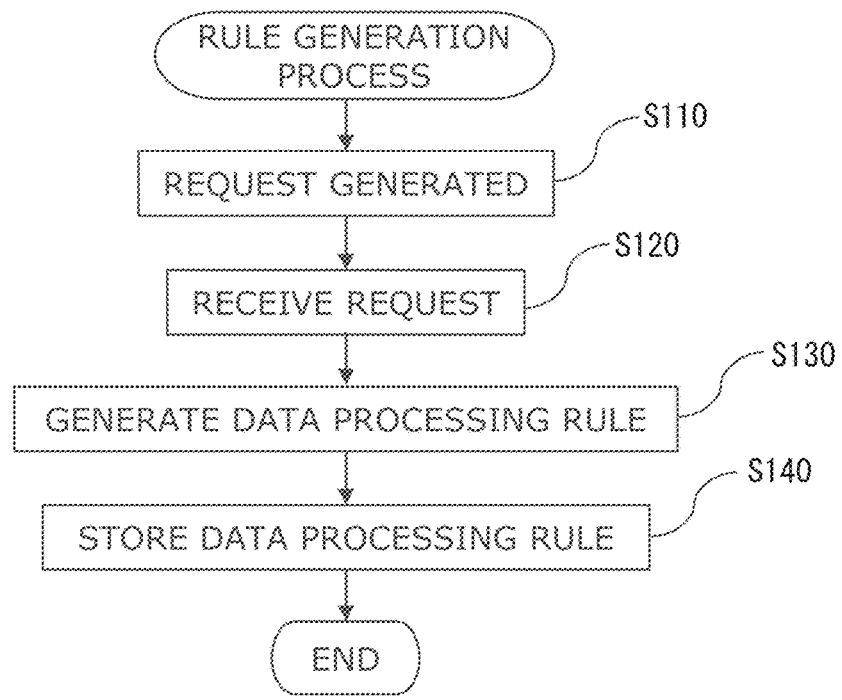
FIG. 6 shows a flowchart of a rule generation process.

FIG. 4 shows the entire flow performed by the system 10 (more specifically, the node processors 16a and the sever processors 26a at the OEM and the repair shop) when asset transfer is requested. In general, the flow generally includes a rule generation process S100, a command generation process S200, a data processing process S300, and a verification process S400 as shown in FIG. 5. In the rule generation process S100, the node processor 16a generates the data processing rule 20 according to the data processing request. More specifically, as shown in FIG. 6, when the owner A makes the data processing request via, e.g., a mobile phone, the rule generation process starts at S110. When the request is generated, one of the business entities (for example, the OEM) receives the data processing request at S120. Upon receiving the data processing request, the processing manager application 30 (i.e., the node processor 16a) automatically generates the data processing rule 20 according to the received data processing request at S130.

As shown in FIG. 4, the processing manager application 30 generates the data processing rule 20 showing the categories of the repair item and the diagnostics as "keep," the category of the repair bill information as "remove," and the category of the vehicle related information as "de-identify," as requested by the owner A. Then, at S140, the processing manager application 30 stores the generated data processing rule 20 on the blockchain BC. Accordingly, the data processing rule 20 is securely stored on the blockchain BC and authorized persons such as the owner A, the new owner B, and other interested persons can access to the data processing rule 20 stored on the blockchain BC. The rule generation process S100 is terminated when the data processing rule 20 is stored on the blockchain BC.

Figure 7:
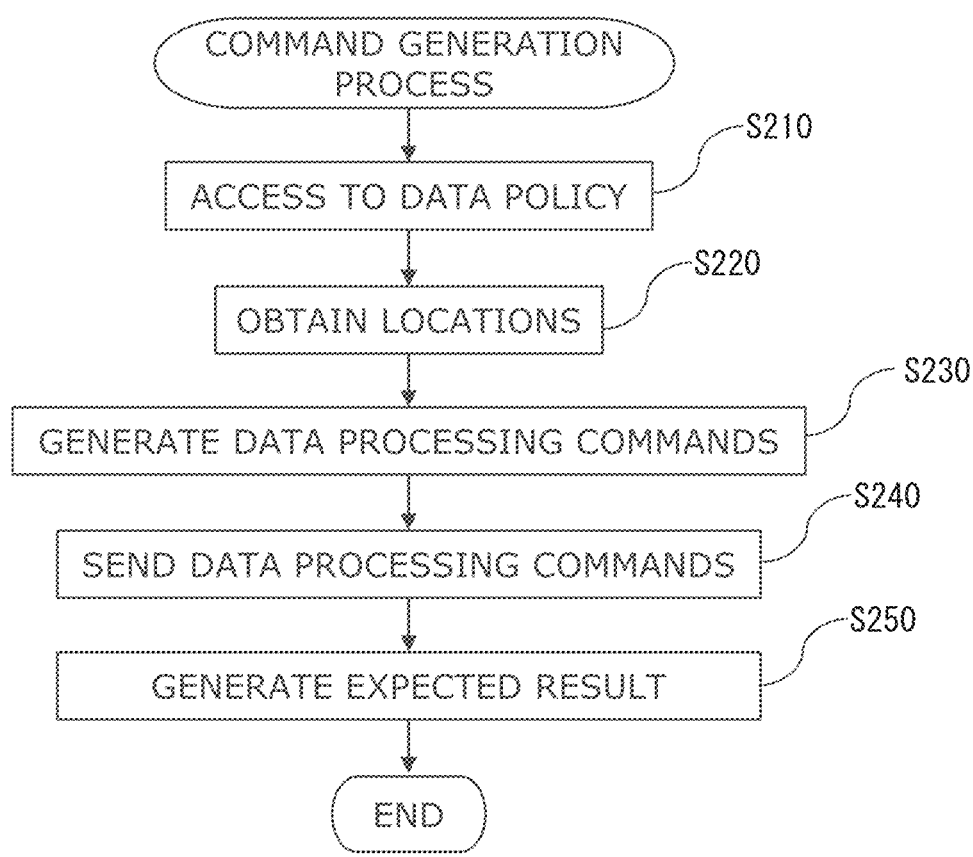
FIG. 7 shows a flowchart of a command generation process.

Next, the command generation process S200 will be described with reference to FIG. 7. At S210, the processing manager application 30 accesses to the root policy 32 first and instruct it to obtain locations based on the data processing rule 20. The root policy 32 obtains locations for the categories by referring to the location table 24 and sends the locations to the processing manager application 30 at S220. In this example, the root policy 32 obtains the locations of the repair item, the diagnostics, and the repair bill information that are stored on the DB 28 of the repair shop and the location of the vehicle related information that is stored on the DB 28 of the OEM. Upon receiving the locations from the root policy 32, the processing manager application 30 generates the data processing commands 34 based on the data processing rule 20 and the locations at S230. In this case, the processing manager application 30 generates two data processing commands 34 for the server 26 of the repair shop and the servers 26 of the OEM as shown in FIG. 4. The processing command 34 for the server 26 of the repair shop instructs the server 26 to keep the diagnostics and the repair item and remove the repair bill information. The processing command 34 for the server 26 of the OEM instructs the server 26 to de-identify the vehicle related information. Then, at S240, the processing manager application 30 sends each data processing command 34 to the corresponding server 26. In this way, since the location of each data category is stored in the location table 24. Thus, the data processing command 34 can be sent to a proper server 26 that stores the target data category to be treated.

Next, the processing manager application 30 generates the expected result 36 according to the data processing rule 20 at S250. In this example, the expected result 36 indicates the categories of the repair item and the diagnostics as "no change," the category of the repair bill information as "none," and the category of the vehicle related information as "personal data items: none" and "non-personal data items: no change", as shown in FIG. 4. Then, the command generation process S200 ends.

Figure 8:
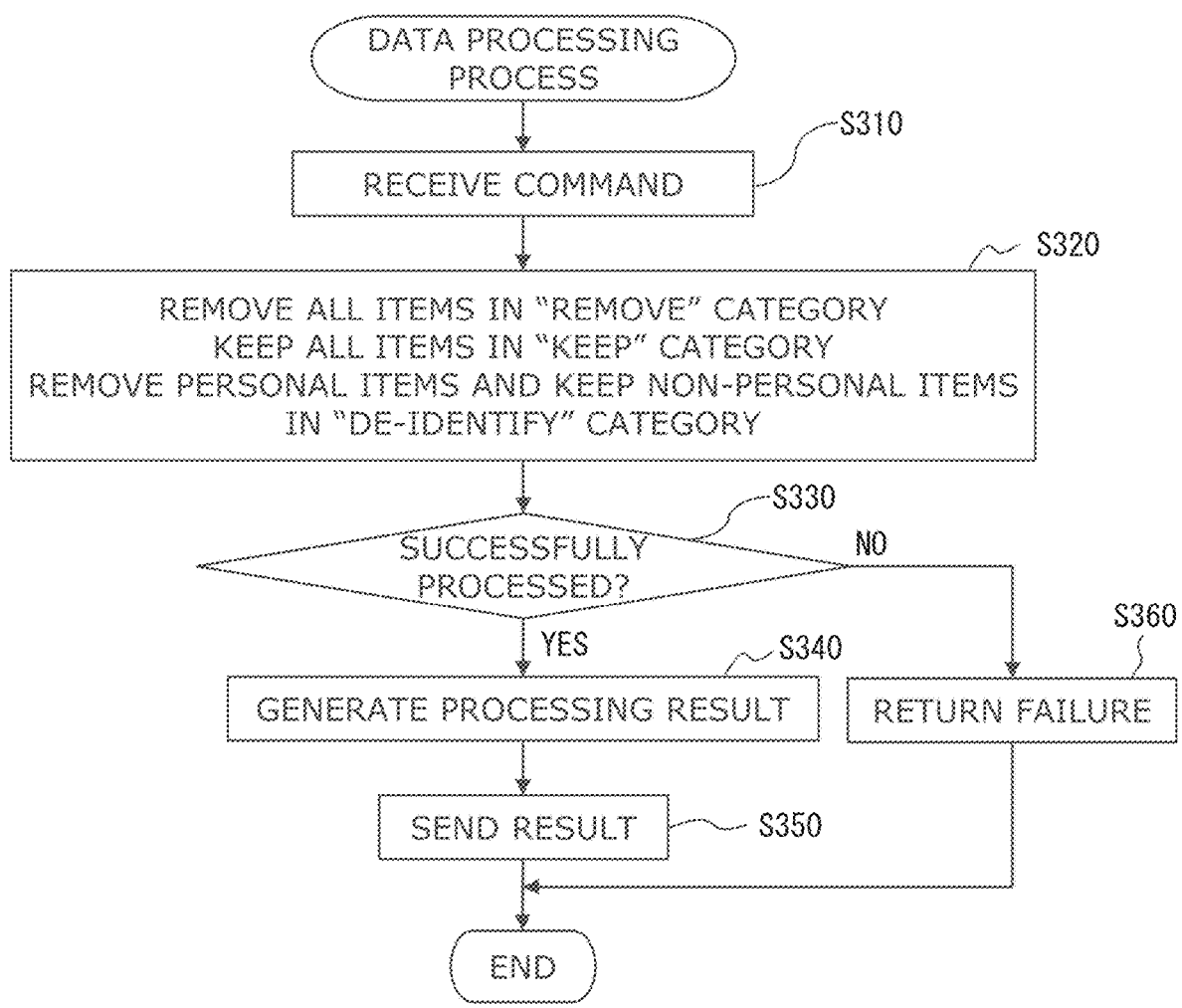
FIG. 8 shows a flowchart of a data processing process.

With reference to FIG. 8, when the sever 26 receives the data processing command 34 at S310, the data processing process S300 starts. In the data processing process S300, the server processor 26a processes the asset data stored on the DB 28 according to the received data processing command 34 at S320. In this example, the server processor 26*a* of the repair shop deletes all data items included in the repair bill information according to the data processing command 34. That is, the server processor 26*a* deletes the replacement fees of parts A and B, the diagnostics fees, and the account information. On the contrary, the server processor 26*a* of the repair shop does nothing to the data items included in the repair item and the diagnostics which are designated as "keep". More specifically, the server processor 26*a* leaves the parts A and B and the diagnostics result (i.e., Good) on the DB 28 of the repair shop. In this way, the server processor 26*a* processes the asset data according to the data processing command 34 that is customized for each business entity BE. Thus, the server 26 can accurately process the asset data according to the request by the owner A. Furthermore, the server 26 mechanically processes the asset data stored thereon according to the command 34 without any discretion. Thus, the asset data can be properly addressed at the server 26 and the server 26 can be prohibited from arbitrarily treating the asset data.

Similarly, at the OEM, the server processor 26*a* processes the asset data stored on the DB 28 according to the data processing command 34 received by the OEM. In this case, the data processing command 34 instructs the server processor 26*a* to de-identify the data items included in the vehicle related information. When the data processing command 34 instructs the server processor 26*a* to de-identify the data items, the server processor 26*a* is programmed to process the data items according to the labels attached to the data items. In this embodiment, "de-identify" is interpreted as delete all data items that are labeled as "personal" and keep all data items that are labeled as "non-personal". Thus, in this example, the server processor 26*a* of the OEM deletes the data item of "locations" from the DB 28. On the contrary, the server processor 26*a* keeps the data items of "speed" and "acceleration" on the DB 28. In this way, even when an owner generally designates a data category as "De-identify", the server 26 can properly address the asset data according to the labels attached to the data items.

When the server processor 26*a* completes processing the asset data successfully (S330: yes), the server processor 26*a* generates a processing result 22 at S340. Then, the server processor 26*a* sends the processing result 22 to the node 16 at S350, and the data processing process S300 ends. On the contrary, if the server processor 26*a* fails to process the asset data, the server processor 26*a* returns a failure notification to the node 16 at S360 and the data processing process S300 ends. In this case, when the node 16 receives the failure notification, the node 16 ends the entire process of the asset transfer.

Figure 9:
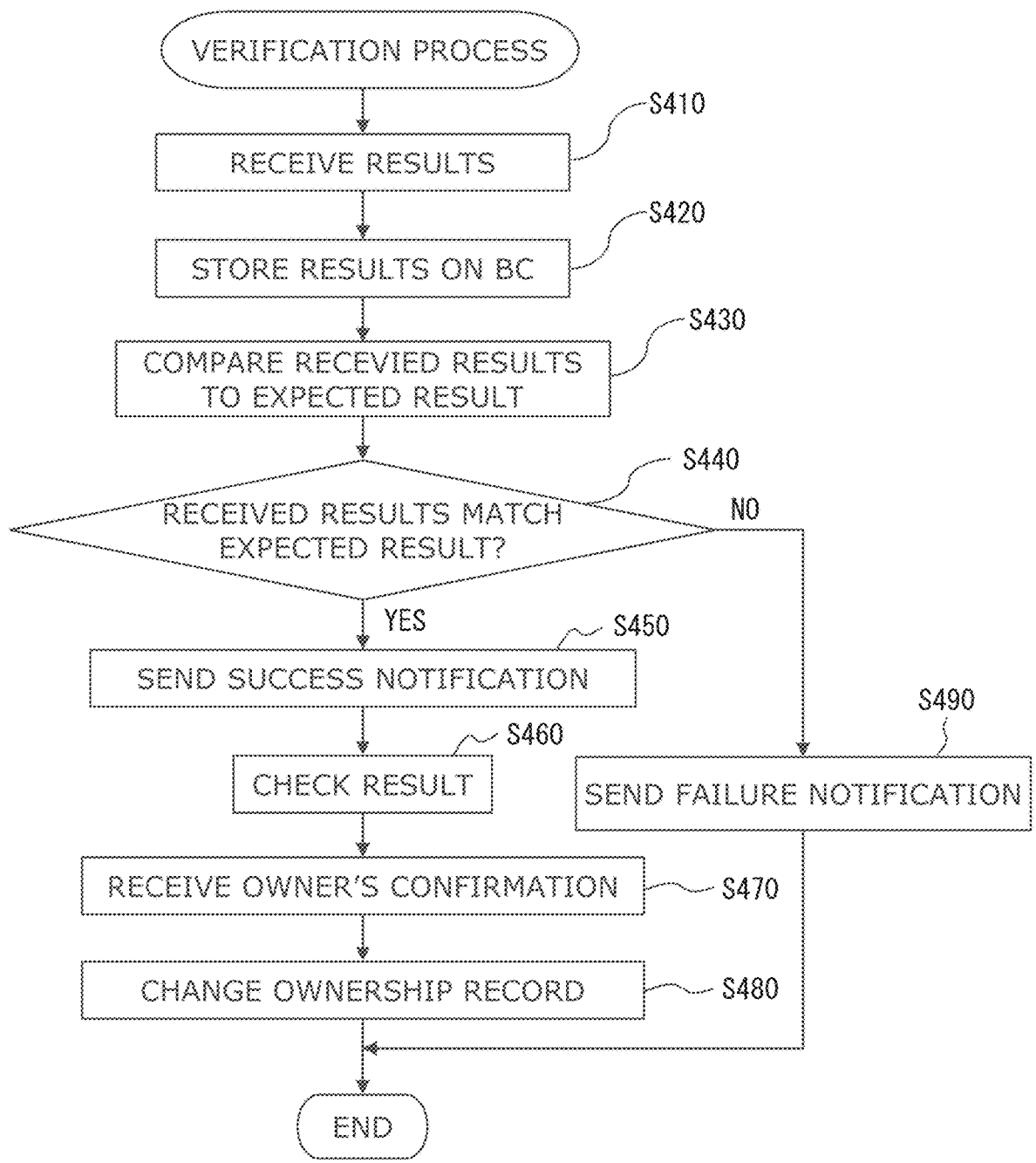
FIG. 9 shows a flowchart of a verification process.

Next, the verification process S400 will be described with reference to FIG. 9. When the processing manager application 30 receives the data processing results 22 from the repair shop and the OEM at S410, the processing manager application 30 stores the processing results 22 on the blockchain BC at S420. Then, the processing manager application 30 compares the received processing results 22 to the expected result 36 at S430. If the processing results 22 match the expected result 36 (S440: Yes), the processing manager application 30 verifies that the asset data regarding the vehicle A was properly processed at the repair shop and the OEM. Then, the processing manager application 30 sends the success notification that the asset data was properly processed to the owner A at S450. When the owner A receives the success notification, the owner A confirms that the asset data was properly processed by checking the processing results 22 stored on the blockchain BC at S460. Then, the owner A returns the confirmation to the processing manager application 30 at S470. In this way, since the data processing results 22 are stored on the blockchain BC and the owner A can confirm whether the asset data was properly addressed by checking the stored results 22. Further, the results 22 are securely stored on the blockchain BC, the history of processing the asset data of an asset can be securely recorded with a very low risk of tampering.

Upon receiving the confirmation from the owner A, the processing manager application 30 changes the record of the ownership of the vehicle A in the data asset pool 18 from the owner A to the new owner B at S480. Then, the verification process S400 ends. On the other hand, if the processing results 22 do not match the expected result 36 (S440: No), the processing manager application 30 sends the failure notification to the owner A at S490 and the verification process S400 ends.

As described above, according to the asset transfer recording system 10 in the present embodiment, the asset data can be accurately processed according to the owner's request when asset transfer is requested. Thus, personal data, for example, stored on the servers 26 can be accurately removed before the ownership of an asset is transferred. Thus, it is possible to prevent personal information of the owner from being disclosed to the new owner. Furthermore, through the system 10, the owner can freely decide whether to delete or keep data items according to the owner's preference.

Further, the system 10 stores, on the blockchain BC, the data processing rule 20 that defines how the data asset should be addressed. The system 10 also stores the data processing results 22 done by the servers 26 on the blockchain BC. Therefore, the data processing history can be verified at any later time based on the stored information by interested persons.

Furthermore, according to the system 10 of the above-described embodiment, the asset data is kept after the personal items are removed from the servers 26 according to the current owner's request. Thus, even after an asset is transferred to a new owner, information related to the transferred asset can be traceable with tamper proof.

Modifications to the Embodiment

In the above-described embodiment, the node processor 16*a* of one of the business entities BE generates the data processing rule 20 and the data processing commands 34 upon receiving the data processing request from an owner. In other words, the above-described rule generation process S100, the command generation process S200, and the verification process S400 are performed mainly by the node processor 16 of one of the particular business entities BE. However, the system 10 may include a center node which is configured to dedicatedly perform the rule generation process S100, the command generation process S200, and the verification process S400.

In the above-described embodiment, a plurality of business entities BE constitute the system 10. However, a single business entity may constitute the system 10. Furthermore, the system 10 may be used to record an asset transfer history for any types of tangible and intangible properties such as movables (e.g., motorbikes, ships, airplanes, devices, and batteries), real estates (smart homes, buildings), and digital assets.

The invention claimed is:

1. An asset transfer recording system, comprising:
a node that stores a blockchain to record a history of an asset transfer; and
a data storage server that stores asset data of an asset to be transferred, the asset data being formed of a plurality of data items that have been collected and updated, wherein
the node includes:
  a node processor; and
  a node memory coupled to the node processor and storing program instructions that, when executed by the node processor, cause the node processor to:
    generate a data processing rule according to a request by a transferor of the asset, the data processing rule defining a rule of processing the asset data;
    store the data processing rule on the blockchain;
    generate a data processing command according to the data processing rule, the data processing command being a command for the data storage server to process the plurality of data items; and
    send the data processing command to the data storage server, and
the data storage server includes:
  a server processor; and
  a server memory coupled to the server processor and storing program instructions that, when executed by the server processor, cause the server processor to:
    process the plurality of data items of the asset data stored on the data storage server according to the data processing command upon receiving the data processing command from the node processor; and
    generate and send a processing result to the node processor upon completing processing the asset data, wherein
the node processor is further programmed to store the processing result of the plurality of data items of the asset data stored on the data storage server on the blockchain upon receiving the processing result from the server processor.

2. The asset transfer recording system according to claim 1, wherein:
the node processor is further programmed to:
  generate an expected result based on the data processing rule; and
  compare the processing result generated by the server processor to the expected result to confirm whether the plurality of data items are correctly processed by the server processor according to the data processing command.

3. The asset transfer recording system according to claim 1, wherein:
the plurality of data items being categorized into a plurality of data categories;
the data storage server includes a plurality of servers, each of the plurality servers storing at least one respective data category of the plurality of data categories with at least one corresponding data item of the plurality of data items;
the node processor is further programmed to store a location table listing each of the plurality of data categories and a corresponding server of the plurality of servers; and
the node processor is further programmed to, by referring to the location table:
  generate a plurality of commands, as the data processing command, each of which is customized for a respective one of the plurality of servers; and
  send each of the plurality of commands to a corresponding one of the plurality of servers.

4. The asset transfer recording system according to claim 1, wherein:
the plurality of data items include a personal data item and a non-personal data item, and
upon receiving the request from the transferor, the node processor generates the data processing command that instructs the server processor to delete the personal data item and leave the non-personal data item.

5. An asset transfer recording method for recording a history of an asset transfer on a blockchain, the method comprising:
storing, with a data storage server, asset data of an asset to be transferred, the asset data being formed of a plurality of data items that have been collected and updated;
generating, with a node, a data processing rule according to a request by a transferor of the asset, the data processing rule defining a rule of processing the asset data;
storing, with the node, the data processing rule on the blockchain;
generating, with the node, a data processing command according to the data processing rule, the data processing command being a command for the data storage server to process the plurality of data items;
processing, with the data storage server, the plurality of data items of the asset data stored on the data storage server according to the data processing command;
generating, with the data storage server, a processing result upon completing processing the asset data; and
storing, with the node, the processing result of the plurality of data items of the asset data stored on the data storage server on the blockchain upon generating the processing result.

6. The asset transfer recording method according to claim 5, further comprising:
generating, with the node, an expected result based on the data processing rule; and
comparing, with the node, the processing result to the expected result to confirm whether the plurality of data items are correctly processed according to the data processing command.

7. The asset transfer recording method according to claim 5, wherein:
the data storage server includes a plurality of servers,
the plurality of data items are categorized into a plurality of data categories;
at least one respective data category of the plurality of data categories with at least one corresponding data item of the plurality of data items is stored in each of the plurality of servers;
a location table listing each of the plurality of data categories and a corresponding server is stored on the blockchain;
the method further comprises, by referring to the location table:
  generating a plurality of commands, as the data processing command, each of which is customized for a respective one of the plurality of servers; and
  sending each of the plurality of commands to a corresponding one of the plurality of servers.

8. The asset transfer recording method according to claim 5, wherein:
   the plurality of data items include a personal data item and a non-personal data item, and
   the method further comprises:
      upon receiving the request from the transferor, generating the data processing command that instructs the data storage server to delete the personal data item and leave the non-personal data item.

9. A computer-readable, non-transitory storage medium storing a computer program configured to cause at least one processor to:
   store, with a data storage server, asset data of an asset to be transferred, the asset data being formed of a plurality of data items that have been collected and updated;
   generate, with a node, a data processing rule according to a request by a transferor of the asset, the data processing rule defining a rule of processing the asset data;
   store, with the node, the data processing rule on a blockchain;
   generate, with the node, a data processing command according to the data processing rule, the data processing command being a command for the data storage server to process the plurality of data items;
   process, with the data storage server, the plurality of data items of the asset data stored on the data storage server according to the data processing command;
   generate, with the data storage server, a processing result upon completing processing the asset data; and
   store, with the node, the processing result of the plurality of data items of the asset data stored on the data storage server on the blockchain upon generating the processing result.

* * * * *